(12) United States Patent
Scholz et al.

(10) Patent No.: US 6,619,743 B1
(45) Date of Patent: Sep. 16, 2003

(54) ADJUSTMENT ARMATURE FOR SEATS, ESPECIALLY MOTOR VEHICLE SEATS, WITH AN ADJUSTABLE INCLINABLE BACKREST

(75) Inventors: Grit Scholz, Remscheid (DE); Holger Finner, Hückeswagen (DE); Andreas Vedder, Solingen (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 10/049,394
(22) PCT Filed: Aug. 5, 2000
(86) PCT No.: PCT/EP00/07608
§ 371 (c)(1), (2), (4) Date: Feb. 12, 2002
(87) PCT Pub. No.: WO01/12461
PCT Pub. Date: Feb. 22, 2001

(30) Foreign Application Priority Data
Aug. 14, 1999 (DE) .......................... 199 38 666

(51) Int. Cl.⁷ ............................... B60N 2/22
(52) U.S. Cl. .................... 297/362; 297/374; 74/528
(58) Field of Search ............ 297/362, 354.1, 297/361.1, 374, 375; 74/528

(56) References Cited

U.S. PATENT DOCUMENTS

| 5,154,475 A | 10/1992 | Kafitz |
| 5,634,380 A * | 6/1997 | Scholz et al. .......... 74/528 X |
| 5,810,442 A * | 9/1998 | Ito et al. .......... 297/362.11 |
| 6,305,748 B1 * | 10/2001 | Ohba ................... 297/362 |

FOREIGN PATENT DOCUMENTS
FR 2743032 7/1997

* cited by examiner

Primary Examiner—Anthony D. Barfield
(74) Attorney, Agent, or Firm—Friedrich Kueffner

(57) ABSTRACT

The invention relates to an adjustment armature comprising a fixed component (11) which is associated with part the seat and an adjustable component (12) which is connected to the backrest. The components of the armatures (11, 12) are joined to each other by means of an actuating member (13). An adjusting and locking device, having the form of a gear, is provided in order to adjust the relative positions of the two armature components (11,12). The adjusting member (13) comprises an eccentric segment (14), whereby one of the armature components (12) is mounted thereon. The other armature component (11) acts as a bearing for the eccentric segment (14). The eccentric segment (14) is comprised of wedge segments (27), which rest against each other and partially overlap a catch (20). Said eccentric segment is also provided with a catch segment (29) between the narrow sides thereof and an energy accumulator which moves the wide ends of, the wedge segments (27) apart. The actuating member (13) optionally comprises a central receiving section for a rotationally fixed connection to the transmission rod. The catch (20) is made up of a bushing (21), and a ring (26), which is rotationally fixed to said bushing and consists of a catch segment (29), whereby no free movement can be felt when the armature (10) is initially displaced for adjustment purposes. The catch ring (26) is mounted on the armature component (11) and acts as a bearing for the wedges (27) in a peripheral region of said ring, which does not contain said catch segment (29).

8 Claims, 4 Drawing Sheets

ADJUSTMENT ARMATURE FOR SEATS, ESPECIALLY MOTOR VEHICLE SEATS, WITH AN ADJUSTABLE INCLINABLE BACKREST

BACKGROUND OF THE INVENTION

1. Field of the Invention

The invention relates to an adjustment armature for seats with an adjustable inclinable backrest, in particular, for motor vehicles seats, wherein a fixed armature part correlated with the seat part and an adjustable armature part correlated with the backrest are connected to one another by an actuating member, wherein an adjusting and locking device, determining the position of both armature parts relative to one another and configured as a gear, is provided, and wherein the actuating member comprises an eccentric segment on which one of the armature parts is supported while the other-armature part supports the eccentric segment, which eccentric segment is comprised of two wedge segments covering partially a driver and inclined relative to one another, of a driver segment engaged between their narrow sides, and of a force storage means forcing the wide sides of the wedge segments apart, wherein the actuating member, if necessary, has a central receptacle for a fixed connection with a transmission rod.

2. Description of the Related Art

From DE 44 36 101 A1 an adjustment armature of the aforementioned kind is known in which the inner surfaces of the wedge segments are supported on a projecting collar correlated with the fixed armature part. The outer surfaces of the wedge segments are surrounded by a bearing bushing which is fixedly connected to the armature part of the backrest. For driving the eccentric segment a driver arm projecting from the driver engages between the narrow sides of the two wedge segments while the driver itself is supported in the projecting collar of the fixed armature part. In this connection, the wedge segments are forced apart by a spring element acting on the wide sides positioned opposite the driver arm in the direction of maintaining the eccentricity. In order to allow for a compensation movement of the eccentricity in the case of unavoidable manufacturing tolerances at the bearing locations and the toothing of the armature parts during adjustment of the armature part of the backrest, a space for play is present between the narrow sides of the wedge segments and the driver arm as a result of the operating conditions. During adjustment of the armature part, particularly upon reversal of direction, this results in an inactive stroke which is noticeable as dead travel by the user of the seat.

It is an object of the invention to improve the adjustment armature of the aforementioned kind such that the dead travel is eliminated.

This object is solved in that the driver is formed of a driver bushing and a driver ring fixedly connected thereto and comprising the driver segment, wherein the driver ring is supported on the armature part and supports, in turn, the wedge segments on its circumferential area free of the driver segment. As a result of the support of the wedge segments on the circumferential area of the driver ring that is free of the driver segment a frictional force acts as a driving moment between the driver ring and the wedge segment when a rotational movement is transmitted via the driver bushing onto the driver ring. The substantially smaller frictional moment between the wedge segments and the bearing bore, in the present case of the armature part of the backrest, acts on the outer side of the wedge segments. Up to a certain external load the frictional moment between the wedge segments and the driver ring is sufficient in order to rotate the eccentric segment and to thus adjust the armature part of the backrest. As a result of this, the armature part of the backrest can be adjusted without recognizable inactive stroke even when reversing direction. During this adjusting movement, the wedge segments, as a result of constraining forces resulting from the manufacturing process, perform a compensation movement which adapts to the geometric conditions in order to eliminate play within the bearing locations and within the tooth engagement. When now the predetermined outer load is surpassed and the frictional moment between the wedge segments and the driver ring is no longer sufficient, the rotational speed of the leading wedge segment is reduced until both wedge segments at a certain force level overcome the force storage means acting on their wide sides and impact with their wide sides on one another and thus abut one another, wherein also the driver segment of the driver ring may contact at one side a narrow side of a wedge segment, so that the armature part of the backrest is adjusted farther. Upon actuation of the driver, independent of the rotational direction, the articulated armature of the backrest is adjusted instantly. It is understood in this connection that the driver bushing must not necessarily comprise a continuous driver segment but instead can also have two spaced-apart driver cams.

Even though it is conceivable that the driver bushing and the driver ring are formed as a unitary component, it can be advantageous for assembly-technological reasons to configure the driver ring and the driver bushing of two separate armature parts which are connected to one another for torque transmission in a positive-locking way. For this purpose, the driver ring in the area of its driver segment can have a recess arranged inwardly in the radial direction which recess is engaged by at least one driver nose of the driver bushing in a torque-transmitting way.

When arranging the wedge segments on a driver ring so that they partially surround the driver ring—as is the case in principle for any support location—the problem described in the following results. When a bushing is supported on a cylinder, as in the described prior art solution in the case of the support of the driver on the projecting collar of the armature part, both parts have usually only a single contact point acting as a support point where they contact one another as a result of the unavoidable play. This contact point will adjust always within the resultant force caused by the loading of the bearing location. When the direction of this resultant force changes, as, for example, upon pulsating loading of the seat, this contact point always will adjust to the respective effective force direction. Accordingly, the driver within the projecting collar of the armature part will roll which is noticed by the user of the seat as play within the backrest. A negative impression of the quality and a disturbance of the driver by play movements when driving are the result.

In order to counteract the aforementioned conditions, the aforementioned support lines must be placed in a defined way, which extend relative to the tooth engagement location in a certain angular position and also relative to one another in the area of the wedge segments between their inner surfaces and the circumference of the driver ring, the circumferential area of the driver ring which is not covered by the driver segment has a curvature which deviates from the curved inner surface of the wedge segments. In this way, the difference of the curvatures of the circumferential area of the driver ring which is free of the driver segment, on the one hand, and of the inner surface of each wedge segment, on the other hand, can be selected such that the resulting support points between wedge segment and driver ring have such a support point angle relative to the tooth engagement location that the effective line of the resulting support force remains within the support point angles.

In order to be able to prescribe different self-locking conditions of the wedge segments for predetermined friction pairs (inner surface of the wedge segment relative to the circumferential area of the driver ring), the center point of the driver ring and thus also its circumferential area relative to the center, i.e., the rotational axis of the driver bushing, can be moved by a minimal amount in the positive or negative direction of eccentricity. In this way, it is possible, for the same wedge angle of the wedge segment to vary the support point angle so that the possibility of optimizing the frictional connection of the system is provided. The control paths of the wedge segments now no longer depend on the support point angle of the wedge segment itself so that the inactive stroke upon actuation of the system can be influenced. When introducing a rotational movement into the driver, the wedge gap between the inner surface of the wedge segment and the circumferential area of the driver ring can be changed, wherein either the leading or trailing wedge segment is directly driven by the eccentric movement of the outer contour of the driver ring. Accordingly, the inactive stroke can be shortened so that the idle time of the adjustment is significantly reduced.

For a defined determination of the support point angle for the same curvature of the free circumferential area on the driver ring, the inner surface of each wedge segment can be divided into two areas of different curvatures which, starting at the narrow side of the wedge segment, on the one hand, and starting on the wide side of the wedge segment, on the other hand, result in a harmonically narrowing wedge gap, respectively, and the curvatures of each wedge segment meet at an apex such that it coincides with the desired support point and thus forms the contact between the wedge segment and the circumferential area of the driver ring. For a defined determination of the support point angle and for the same curvature of the inner surfaces of the wedge segments with a radius of curvature deviating relative to its external surface, whose center point can deviate from the center point of the driver, it is also possible to divide the free circumferential area of the driver ring correlated with each wedge segment into two areas with different curvatures which, in turn, meet one another at an apex which coincides with the support point and forms thus the contact between the wedge segment and the circumferential area of the driver ring. In this case, the support lines are positioned on the circumferential area of the driver. For a different position of the wedge segments the position of the support lines thus does not change and the support point angle remains the same.

BRIEF DESCRIPTION OF THE DRAWINGS

The invention is illustrated by means of one embodiment in the drawing and will be explained in the following in more detail. It is shown in.

DESCRIPTION OF PREFERRED EMBODIMENTS

Figure 1:
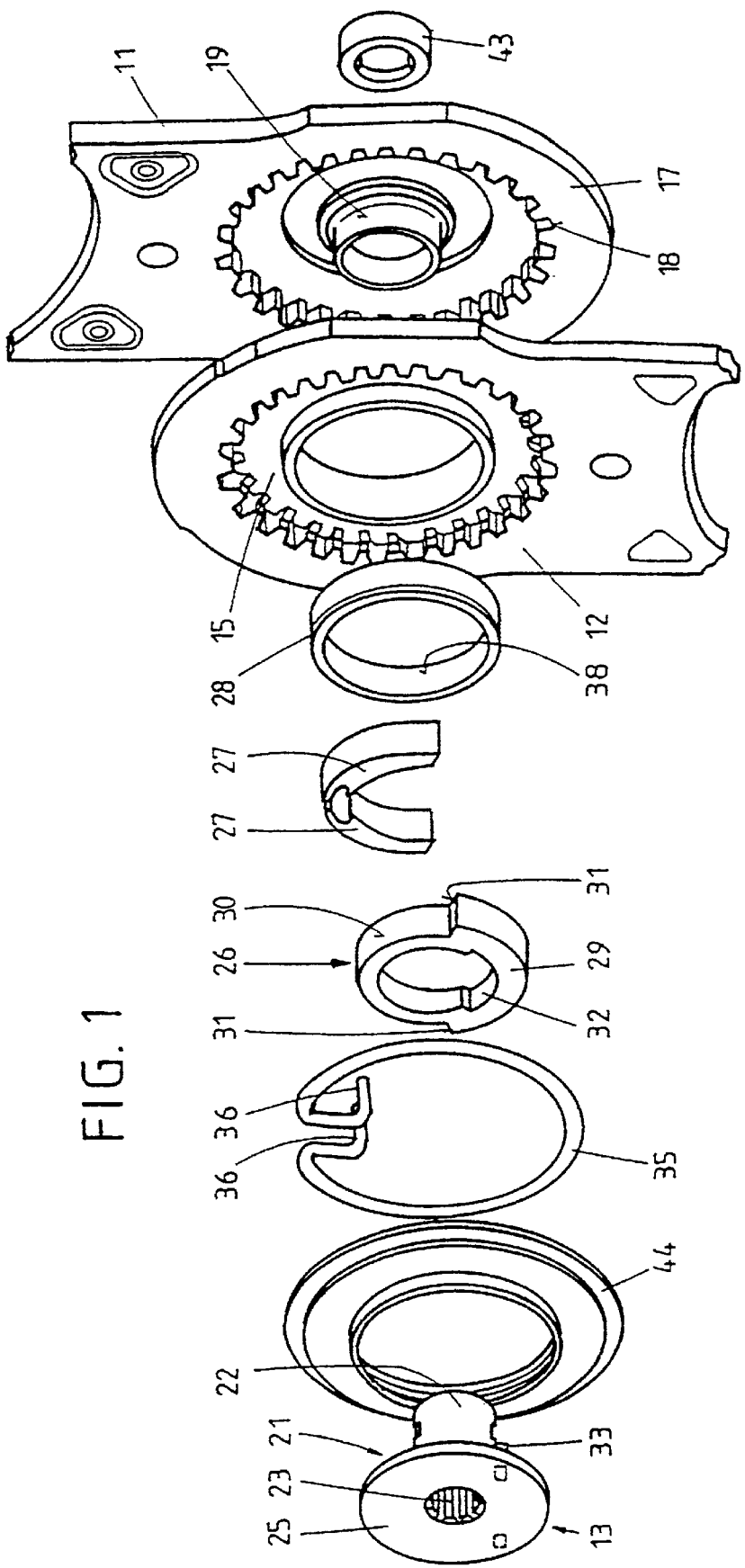
FIG. 1 the armature parts of the adjustment armature according to the invention in a perspective exploded illustration.
Figure 2:
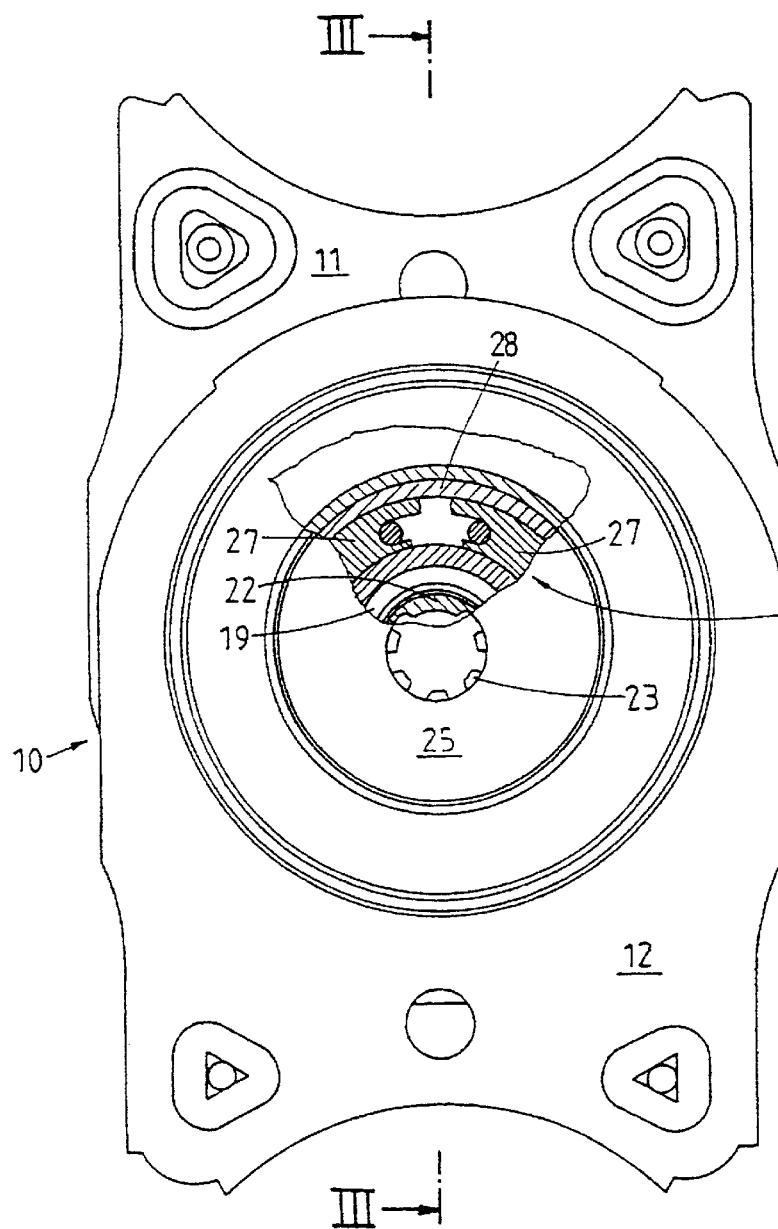
FIG. 2 the adjustment armature in the mounted state in a broken-away view.
Figure 3:
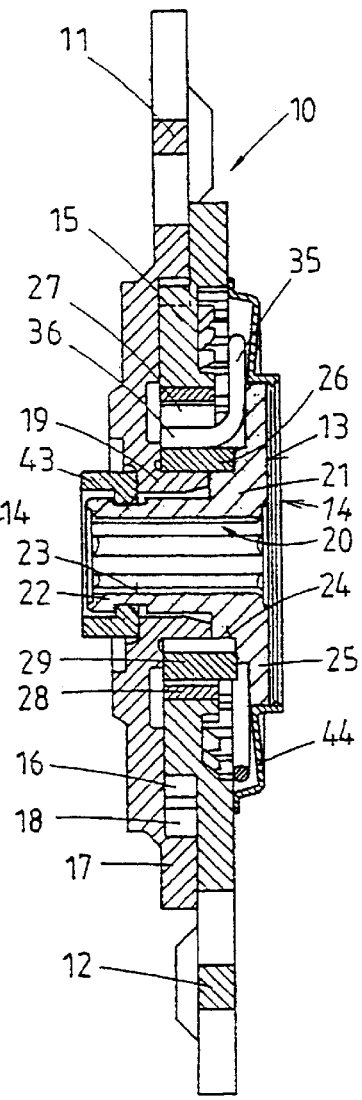
FIG. 3 the adjustment armature illustrated in FIG. 2 in longitudinal section along the line III—III of FIG. 2.

It should first be mentioned that the adjustment armature illustrated in the Figures of the drawings is illustrated only in such a form as is necessary for understanding the invention. For example, it is particularly not illustrated how the adjustment armature is arranged on both longitudinal sides of a seat between the backrest and the seat part, and it is also not illustrated how the torque is introduced into the driver, for example, on one longitudinal side of the seat, and transmitted onto the other adjustment armature on the opposed longitudinal side of the seat. Moreover, the seat itself is not illustrated because it can be embodied in conventional and known configurations.

The adjustment armature 10 connecting the seat part with the backrest has a fixed armature part 11 connected to the seat part and an armature part 11 which is connected to the backrest and adjustable relative to the armature part 11 wherein the armature parts are connected to one another by an actuating member 13 comprising an eccentric segment 14. The actuating member 13 is also a component of an adjusting and locking device formed as a gear which includes also a spur gear 15, for example, formed out of the armature part 12 by stamping and having an outer toothing 16 meshing with the inner toothing 18 of a crown gear 17 of the armature part 11 which is also formed within the armature part by stamping. The diameter of the tip circle of the outer toothing 16 is smaller by at least one tooth height than the diameter of the root circle of the inner toothing 18. Accordingly, the number of teeth of the toothings 16 and 18 differ by at least one tooth from one another. This means that the number of teeth of the inner toothing 18 is greater than the number of teeth of the outer toothing 16. The illustrated arrangement is selected such that the outer toothings 16 can roll on the inner toothing 18.

The armature part 11 has concentrically to its inner toothing 18 a projecting collar 19 in which a driver 20 is supported which is formed as a driver bushing 21. This driver bushing 21 of the eccentric segment 14 has a hub 22 which engages with play the projecting collar 19 of the armature part 11. This hub 22 has a bore 23 matching a spline shaft profile. A step 24 having a larger diameter adjoins this hub 22 and a disc 25 which has a greater diameter projects past the step. The step 24 of the driver bushing 21 receives partially a driver ring 26 on which two wedge segments 27 are supported in a manner known in the art and which, in turn support with their curved outer surfaces a bushing 28 which is inserted and secured in the armature part 12. The driver ring 26 has a driver segment 29 arranged with play between the narrow sides of the wedge segments 27 (FIG. 4 and 5) and projecting in the radial direction past the circumferential area 30 of the driver ring 26 free of the driver segment 29 so as to form two stops 31. In the area of the driver segment 29 the driver ring has a recess 32 widening in the radial direction which extends segment-shaped in the present embodiment and receives driver noses 33 of the driver bushing 21 at its two ends for a fixed connection of the driver ring 26 with the driver bushing 21.

The facing wide sides of the wedge segments 27 have a recess 34, respectively, engaged by the end fingers 36 of an annular spring 39 forcing the wedge segments 27 apart. Above the recess 34 on the wide side of each wedge segment 27 a projection 37 is arranged which projects past the recess 34, wherein one projection can load the other projection when the friction for certain load conditions during the adjusting movement causes such upon blockage of the wedge segments 27. It is understood in this connection that instead of the projections 37 arranged above the recesses 34, shown best in FIGS. 4 and 5, these projections can also be arranged underneath the recesses 34.

Figure 4:
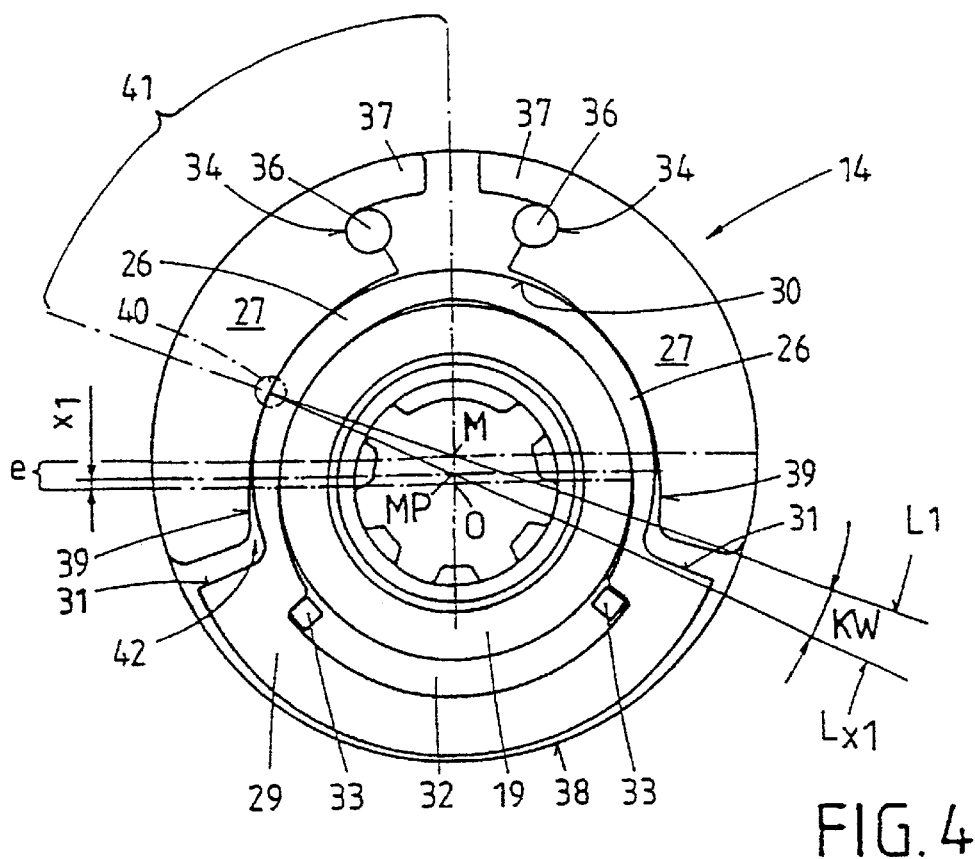
FIG. 4 the eccentric segment of the adjustment armature illustrated in FIGS. 2 and 3, wherein the outer circumferential area of the driver ring which is free of the driver is moved in the direction of the eccentricity by a stroke reducing the effective eccentricity.
Figure 5:
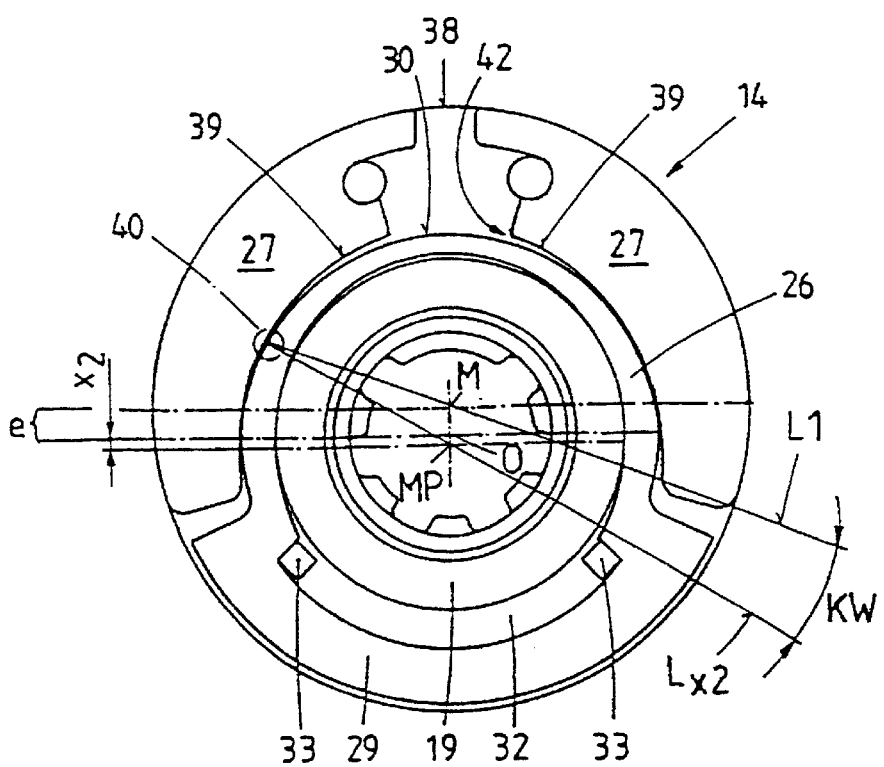
FIG. 5 an eccentric segment modified relative to FIG. 4 in which the outer circumferential area of the driver ring which is free of the driver has been moved in the direction of the eccentricity by a stroke increasing the effective eccentricity.

As can be seen best in FIGS. 4 and 5, the curved outer surfaces of the wedge segments 27 have approximately the same curvature as the inner circumference 38 of the bushing 28 pressed into the armature part 12. On the other hand, the curved inner surface 39 of each wedge segment 27 has a curvature deviating from the circumferential area 30, free of the driver segment 29, of the driver ring 26. This provides a line contact of the wedge segments 27 on the circumferential area 30 of the driver ring 26 which is indicated in FIGS. 4 and 5 as a support point 40. This support point 40 is adjusted at an angle relative to the vertical—i.e., relative to the meshing location of the toothings—which angle is referred to as support point angle 41 and encompasses the angle between the vertical and the line between the support point 40 and the center M of the inner circumference 38 of the bushing 28 pressed into the armature part 12.

The eccentricity 'e' is the spacing between the center 'M' of the bushing 28 pressed into the armature part 12 and the center 'O' of the projecting collar 19 on the armature part 11. It is now possible to connect a line 'L1' between the support point 40 and the center 'M' of the bushing 28 of the armature part 12 and, on the other hand, a line 'LX' can connect the support point 40 and the center point 'MP' of the driver ring 26. The angle formed between the lines 'L1' and 'LX' is referred to as wedge angle 'KW' and is responsible for the self-locking conditions of the eccentric segment 14.

The preset support point angle 40 can be varied by certain changes of the effective eccentricity of the wedge angle 'KW'. As can be seen in FIG. 4, the center point 'MP' of the driver ring 26 can be moved inwardly by the stroke 'X1' in the direction of eccentricity so that the effective eccentricity relative to the eccentric displacement 'e' is reduced. In this case, the wedge angle 'KW' is also reduced, as is illustrated in FIG. 4. In the reverse case, the wedge angle 'KW' can also be enlarged when, in fact, the effective eccentricity is moved outwardly by the stroke 'X2' relative to the eccentric displacement 'e'. In the first situation, a negative eccentric movement takes place while in the second situation the effective eccentricity is obtained by a positive eccentric movement. This results in the first situation in a line 'LX1' which extends between the support point 40 and the displaced center point 'MP' of the effective eccentricity, while in the second situation a line 'LX2' results which, because of an outward movement of the effective eccentricity, results in a greater wedge angle 'KW'. The position of the support point 40 can be determined by the contour of the circumferential area 30 of the driver ring 26 on which the wedge segments are supported. In this connection, the inner surfaces 39 of the wedge segments 27 can be formed by a continuous radius with a center point that is eccentric to the spur gear 15 or can have a different contour such that a harmonically narrowing wedge gap 42 results. This has the advantages that the support point angle 41 for all tolerance positions of the eccentricities remains substantially the same, and the effective wedge angle 'KW', which effects the self-locking conditions of the eccentric segment 14, remains the same. Accordingly, the fluctuations of the force direction of the wedge force decrease so that it can therefore be moved closer to the force optimum resulting from the toothing while taking into account the play release function. In order to be complete, it should be mentioned that the adjustment armature mounted in the position of use is secured by a ring 43 in the axial direction which engages with projections the corresponding grooves in the hub 22. As a protection against contamination of the eccentric segment, a sealing ring 44 is provided which is secured on the disc 25 of the driver bushing 21.

Figure 6:
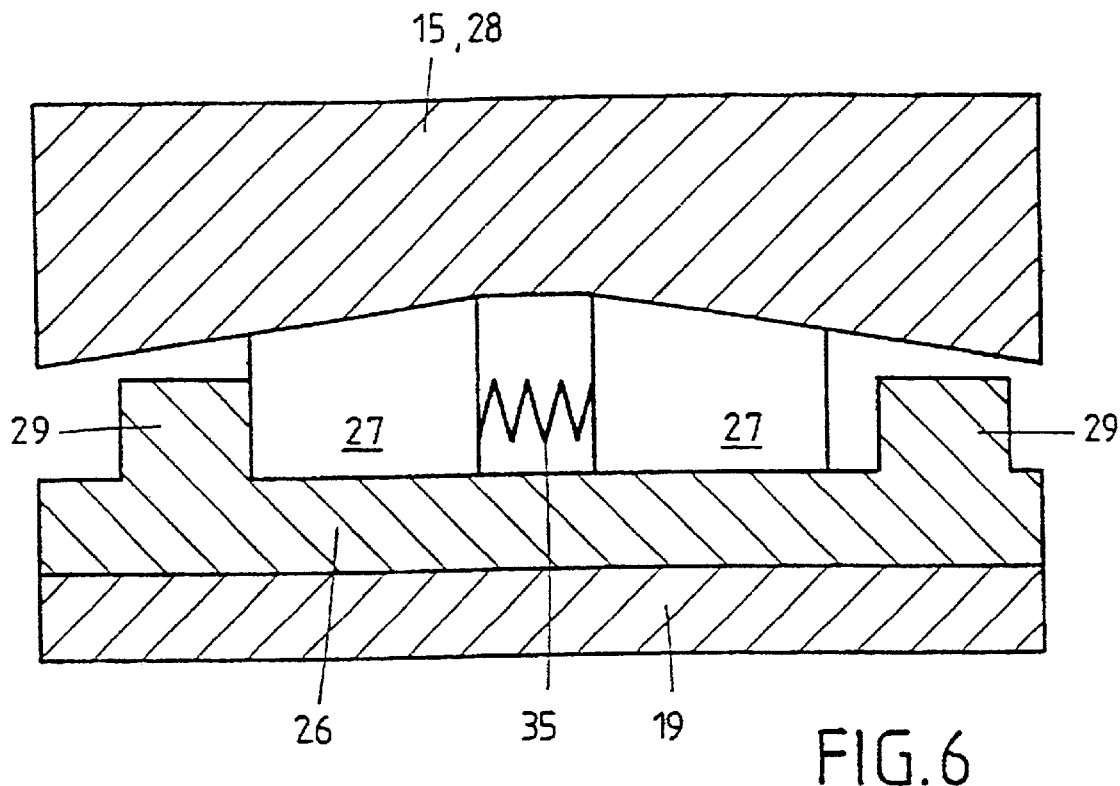
FIG. 6 a developed schematic view of the eccentric segment in which no movement of the outer circumferential area of the driver ring that is free of the driver segment has been carried out.
Figure 7:
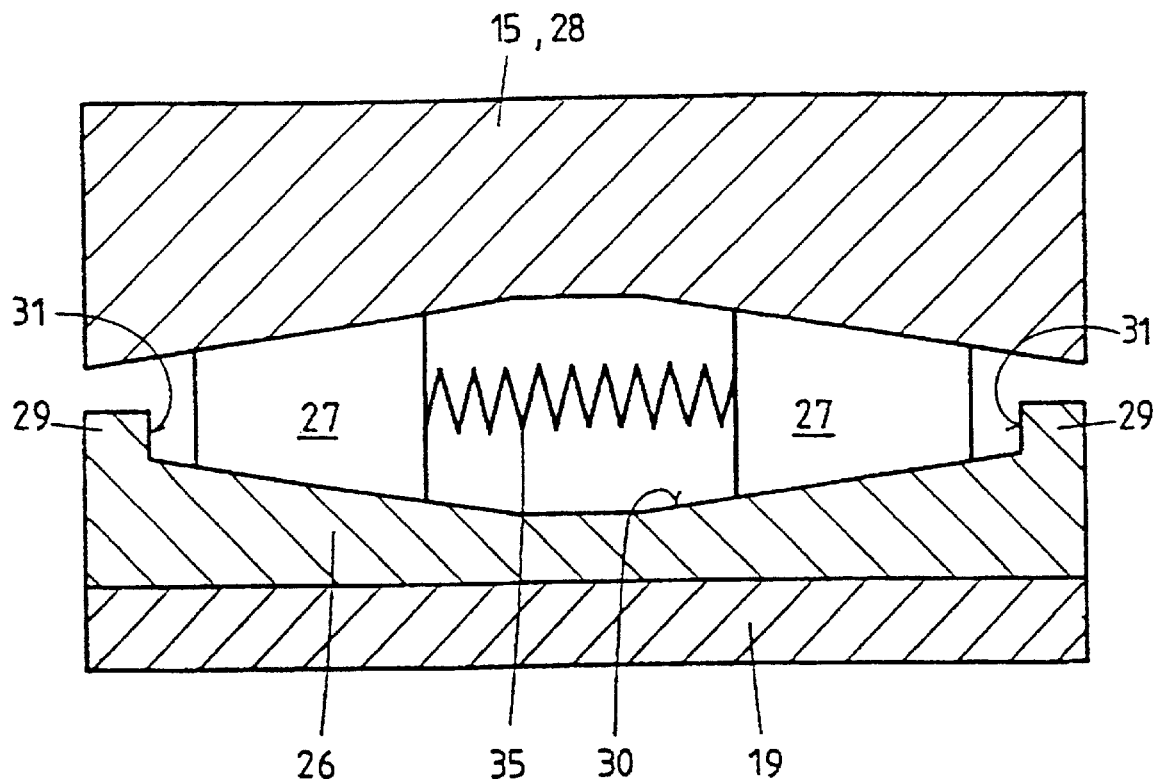
FIG. 7 a developed schematic view of the eccentric segment in which a movement, increasing the eccentricity, of the outer circumferential area of the driver ring, which is free of the driver segment, has been carried out in analogy to FIG. 5.

FIGS. 6 and 7 show schematic illustrations, wherein FIG. 6 shows a developed view of the eccentric segment of an adjustment armature of the aforementioned kind in which no displacement of the eccentricity has been carried out. In FIG. 7, on the other hand, the eccentric segment is illustrated in a developed view wherein a positive eccentric displacement 'X2' has been added to the eccentricity 'e', as illustrated in FIG. 5.

As already mentioned, the invention is illustrated in embodiments but is not limited solely to them. Many variations and different modifications of the principal idea of the invention are conceivable. Moreover, all features that can be taken from the drawings and the description are important with respect to the invention, even though they may not be expressly claimed in the claims.

List of Reference Numerals 10 adjustment armature
11 armature part, fixed
12 armature part, adjustable
13 actuation member
14 eccentric segment
15 spur gear, on 12
16 outer toothing, of 15
17 crown gear, on 11
18 inner toothing, of 17
19 projecting collar, on 11
20 driver
21 driver bushing
22 hub, of 21
23 bore, of 22
24 step, of 21
25 disc, on 21
26 driver ring
27 wedge segment
28 bushing
29 driver segment, of 26
30 circumferential area, on 26
31 stop, on 26
32 recess, in 29

33 driver nose, of 21
34 recess, on 37
35 annular spring
36 end finger, of 35
37 projection, on 27
38 inner circumference, of 28
39 inner surface, of 27
40 support point
41 support point angle
42 wedge gap
43 ring
44 sealing ring
e eccentricity
M center, of 38
O center, of 19
MP center point, of 26
L1 line, 40 to M
LX line, 40 to MP
KW wedge angle
X1 negative eccentric displacement
X2 positive eccentric displacement

What is claimed is:

1. An adjustment armature for motor vehicle seats with an adjustable inclinable backrest, wherein a fixed armature part correlated with the seat part and an adjustable armature part correlated with the backrest are connected to one another by an actuating member, wherein an adjusting and locking device, determining the position of both armature parts relative to one another and configured as a gear, is provided, and wherein the actuating member comprises an eccentric segment on which one of the armature parts is supported while the other armature part supports the eccentric segment, which eccentric segment is comprised of two wedge segments covering partially a driver and inclined relative to one another, of a driver segment engaged between their narrow sides, and of a force storage means forcing the wide sides of the wedge segments apart, wherein the actuating member, has a central receptacle for a fixed connection with a transmission rod, wherein the driver (20) is formed of a driver bushing (21) and a driver ring (26) fixedly connected thereto and the driver segment (29) is defined by the driver ring (26), wherein the driver ring (26) is supported on the armature part (11) and supports, in turn, the wedge segments (27) on its circumferential area (30) free of the driver segment (29).

2. The adjustment armature according to claim 1, wherein the driver ring (26) and the driver bushing (21) are formed of two separate components which, for torque transmission, are positive-lockingly connected to one another.

3. The adjustment armature according to claim 2, wherein the driver ring (26) in the area of its driver segment (29) comprises a recess (32) arranged inwardly in the radial direction and engaged by at least one driver nose (33) of the driver bushing (21) for torque transmission.

4. The adjustment armature according to claim 1, wherein the circumferential area (30) of the driver ring (26) free of the driver segment (29) has a curvature deviating from the curved inner surface (39) of the wedge segments (27).

5. The adjustment armature according to claim 4, wherein the inner circumference of the driver ring (26) has such curvatures that the resulting support points between a projecting collar (19) of the armature part (11) and the driver ring (26) assume such a support point angle (41) relative to the tooth engagement location that the active line of the resulting support force remains within the support point angle (41).

6. The adjustment armature according to claim 5, wherein for the same curvature of the free circumferential area (30) on the driver ring (26) the inner surface (39) of each wedge segment (27) has two areas of different curvatures, which, starting at the narrow side of the wedge segments (27), on the one hand, and starting at the wide side of the wedge segment (27), on the other hand, result in a harmonically narrowing wedge gap (42), respectively, and the curvatures of each wedge segment (27) meet at an apex which coincides with the support point (40) and there forms the contact between the wedge segment (27) and the circumferential area (30) of the driver ring (26).

7. The adjustment armature according to claim 5, wherein for the same curvature of the inner surface (39) of the wedge segments (27 the free circumferential area (30) of the driver ring (26) correlated with each wedge segment (27) has two areas of different curvatures which meet at an apex which coincides with the support point (40) and forms thereat the contact between the wedge segment (27) and the circumferential area (30) of the driver ring (26) from where a wedge gap (42) extends which harmonically widens in both directions.

8. The adjustment armature according to claim 1, wherein for a predetermined support point angle (41) the wedge angle (KW) can be changed by displacement of the center point (MP) of the driver ring (26) relative to the eccentricity (e) in a negative sense (X1) or in a positive sense (S2).

* * * * *